(12) United States Patent
Capps

(10) Patent No.: US 9,022,181 B2
(45) Date of Patent: May 5, 2015

(54) INTEGRAL BRAKING SURFACE WEAR INDICATOR

(75) Inventor: Johnathon Kent Capps, Warrior, AL (US)

(73) Assignee: Webb Wheel Products, Inc., Cullman, AL (US)

( * ) Notice: Subject to any disclaimer, the term of this patent is extended or adjusted under 35 U.S.C. 154(b) by 0 days.

(21) Appl. No.: 13/326,705

(22) Filed: Dec. 15, 2011

(65) Prior Publication Data

US 2013/0153341 A1    Jun. 20, 2013

(51) Int. Cl.
*F16D 51/00* (2006.01)
*F16D 65/10* (2006.01)
*F16D 66/02* (2006.01)

(52) U.S. Cl.
CPC ............... *F16D 65/10* (2013.01); *F16D 66/02* (2013.01)

(58) Field of Classification Search
CPC ..... F16D 66/022; F16D 66/026; F16D 66/02; F16D 2069/004; F16D 65/10
USPC ................... 188/1.11 R, 1.11 W, 218 R, 382
IPC ............................................. F16D 65/10, 66/02
See application file for complete search history.

(56) References Cited

U.S. PATENT DOCUMENTS

| | | | | |
|---|---|---|---|---|
| 1,425,414 A | * | 8/1922 | Page ........................ | 188/218 R |
| 1,818,100 A | * | 8/1931 | Shields ..................... | 188/218 R |
| 1,978,563 A | * | 10/1934 | Bragg ....................... | 188/218 R |
| 2,702,613 A | * | 2/1955 | Walther, Sr. .............. | 188/218 R |
| 2,814,684 A | * | 11/1957 | Depascale .................. | 200/61.4 |
| 2,858,913 A | * | 11/1958 | Afanador ................... | 188/218 R |
| 2,978,073 A | * | 4/1961 | Soddy ....................... | 188/218 R |
| 3,007,553 A | * | 11/1961 | Sinclair et al. ............ | 188/218 R |
| 3,066,766 A | * | 12/1962 | Minor et al. .................... | 188/78 |
| 4,726,455 A | * | 2/1988 | East ......................... | 192/107 R |
| 6,290,031 B1 | * | 9/2001 | Nakamura et al. ........ | 188/218 R |
| 6,308,803 B1 | * | 10/2001 | Oberti ...................... | 188/1.11 W |
| 6,446,770 B2 | * | 9/2002 | Qian et al. ............. | 188/218 XL |
| 2011/0005876 A1 | * | 1/2011 | Jenkinson et al. ........ | 188/218 R |
| 2011/0278102 A1 | | 11/2011 | Cornett | |

FOREIGN PATENT DOCUMENTS

| DE | EP 519340 A1 | * | 12/1992 | ............. | F16D 65/10 |
|---|---|---|---|---|---|
| DE | EP 670434 A1 | * | 9/1995 | ............. | F16D 65/12 |
| EP | 1666756 A1 | | 6/2006 | | |
| JP | 56156532 A | * | 12/1981 | ............. | F16D 66/02 |

OTHER PUBLICATIONS

Notification of Transmittal of the International Search Report and the Written Opinion of the International Searching Authority, or the Declaration.

* cited by examiner

*Primary Examiner* — Bradley King
*Assistant Examiner* — Stephen Bowes
(74) *Attorney, Agent, or Firm* — DLA Piper LLP (US); R. Blake Johnston

(57) ABSTRACT

A brake drum configured for providing an visual indication of braking surface diameter safe operating limits while the brake drum is mounted on a vehicle that includes one or more axially-oriented indentations defined in the braking surface, each of which is defined to a depth that is less than or corresponds to the maximum safe operating diameter of the braking surface.

7 Claims, 4 Drawing Sheets

INTEGRAL BRAKING SURFACE WEAR INDICATOR

BACKGROUND

1. Field

The present invention relates generally to brake drums, and more particularly, to brake drums for heavy-duty vehicles having an external visual indication of whether braking surface diameter is within safe operating limits.

2. Description of the Problem and Related Art

A brake drum's maximum allowable braking surface diameter is the largest diameter that a brake drum's braking surface can be machined, or worn to, and still maintain satisfactory characteristics for safe and expected braking performance. It is a violation of Department of Transportation regulations to use a brake drum whose braking surface diameter exceeds the maximum allowable diameter. At this time, there is not an accurate method of determining whether a brake drum's braking surface diameter has worn to, or exceeded, the maximum allowable diameter while the brake drum is installed on a vehicle. Accordingly, the entire wheel must be removed from the vehicle and the brake drum surface diameter must be measured. It is both time consuming and expensive—not to mention safety issues involved with removing and reinstalling wheel end equipment—to remove a brake drum from an axle to determine whether or not a brake drum has worn to the point that the braking surface diameter exceeds the maximum allowable diameter. This can lead to brake drums being discarded and replaced sooner than needed, or it can lead to brake drums remaining in service after the braking surface diameter exceeds the maximum allowable diameter.

With reference to FIGS. 6 and 6A of the drawings, a prior art technique to permit visual inspection of brake surface diameter has used a notch 30 machined circumferentially around the braking surface at the lip of the drum for wear indication. This method, however, may provide misread inspections because of uneven wear of the brake linings and drum. A step is worn into the lining near the lip of the drum. This uneven wear leads to inaccurate evaluations of both lining wear and brake drum wear, leading to either early removal of a good brake drum, or worse, non-removal of a bad brake drum.

SUMMARY

The present disclosure is directed to a brake drum configured for accurate, visual indication of braking surface adequate thickness without removal from the vehicle on which it is installed.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

An exemplary brake drum includes a braking surface one or more axially oriented notches or indentations defined therein. The notches are defined from the inner edge of the braking surface rim and extend outwardly towards the brake drum hub and are formed to have a depth no greater than a depth corresponding to the maximum allowable diameter of the braking surface of the drum.

This and other embodiments will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1:
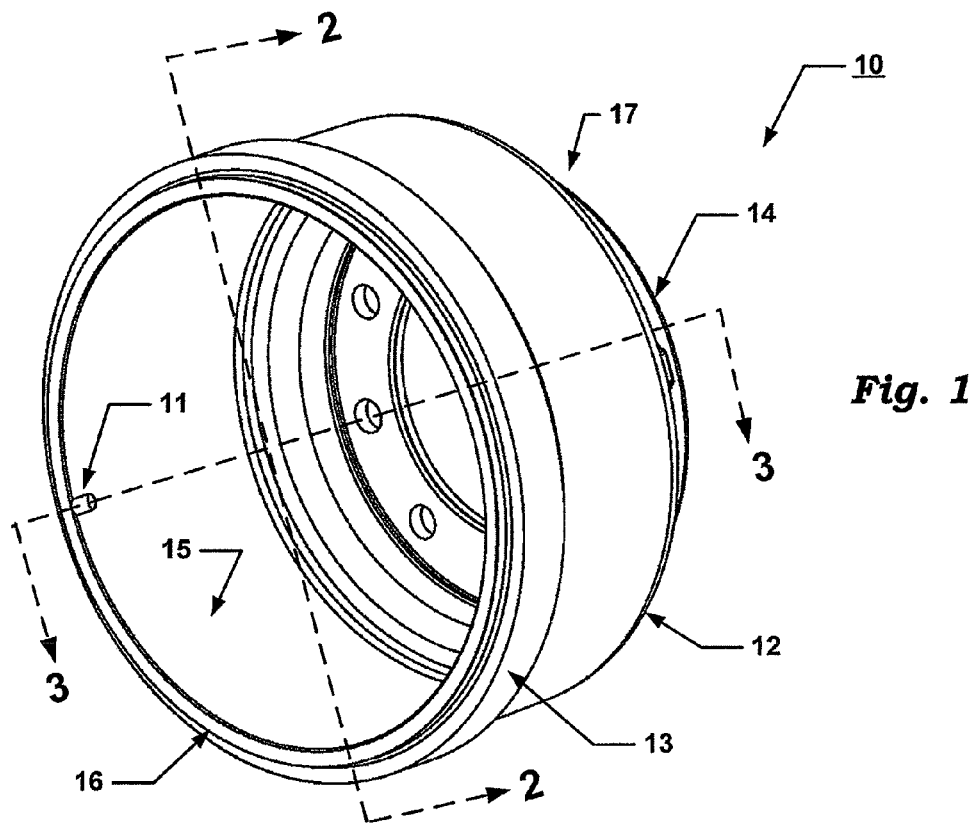
FIG. 1 is an inboard perspective view of an exemplary brake drum with wear indicator in braking surface in an unworn condition.
Figure 2:
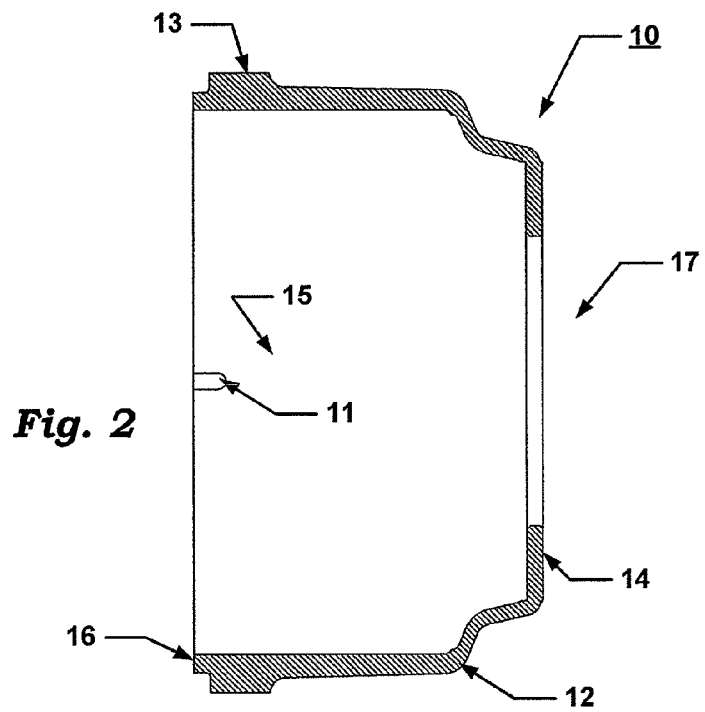
FIG. 2 is a section view of the exemplary brake drum of FIG. 1 along line 2.
Figure 3A:
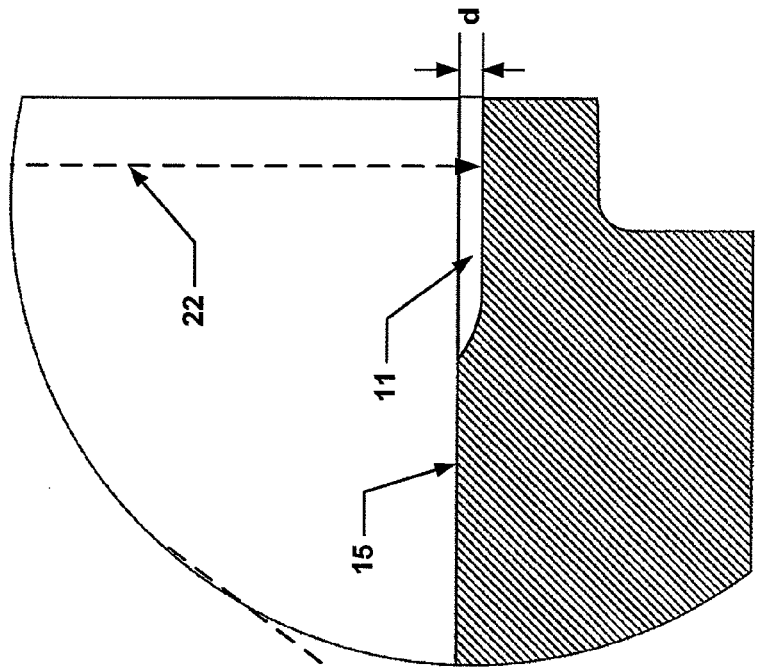
FIG. 3A is an inset of the indicated portion of FIG. 3.
Figure 3:
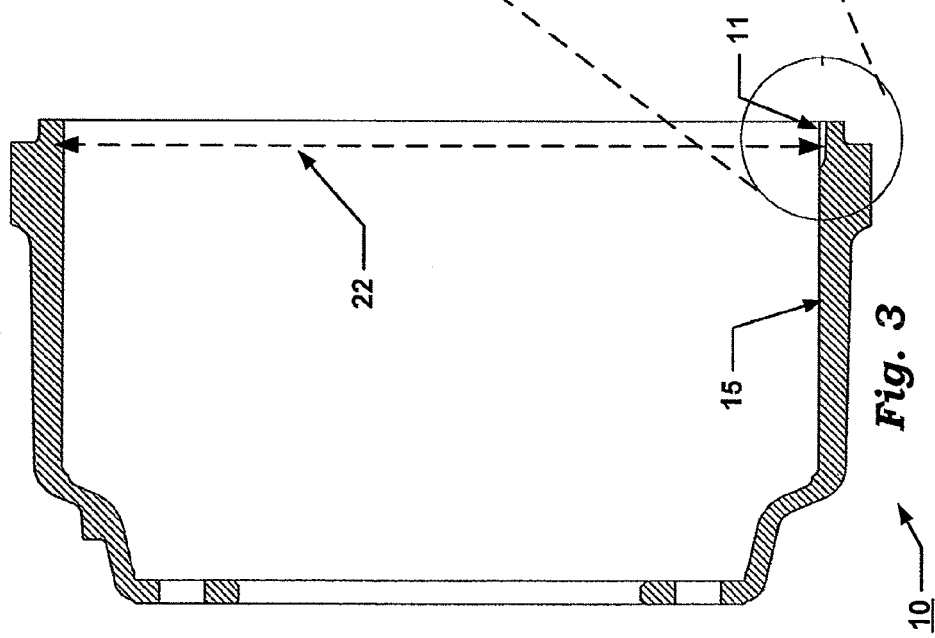
FIG. 3 is a section view of the exemplary brake drum of FIG. 1 along line 3.

The various embodiments of the present invention and their advantages are best understood by referring to FIGS. 1 through 6A of the drawings. The elements of the drawings are not necessarily to scale, emphasis instead being placed upon clearly illustrating the principles of the invention. Throughout the drawings, like numerals are used for like and corresponding parts of the various drawings.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment. Finally, as used in this description, terms such as "inner," "outer," "inboard" and "outboard" are to be understood as they relate to a vehicle on which the brake drum is mounted.

An exemplary brake drum 10 comprises a brake surface 15 made from cast iron or other friction and wear resistant material, a mounting plate 14 at the brake drum's outboard end 17 with mounting holes for mounting the drum to the hub of a vehicle axle, a wraparound, or shoulder portion 12, and one or more squealer bands 13 circumscribing the brake drum. A brake drum 10 is typically used with a brake shoe 20. In operation, the shoe is selectively applied to the braking surface 15 of the brake drum 10 through actuation of the brake. Brake drum 10 converts kinetic energy and potential energy of the vehicle into heat energy by providing a friction surface for the brake shoe thereby transmitting brake torque to the wheels and tires of the vehicle.

A notch 11, or indentation, is defined in the braking surface 15 of the drum 10, extending from the inner lip of the inboard end 16 axially toward the outboard end. The indentation 11 is formed with a depth d in relation to the braking surface 15 that corresponds to, or is within, the maximum allowable diameter 22 of the braking surface 15. The indentation 11 extends outboard from inboard edge so that at least a portion of the area of the indentation 11 overlaps the area of the braking surface 15 that makes contact with the brake shoe. As the braking surface 15 is worn away through use, and the maximum diameter is reached, the indentation 11 is worn away, so that the indentation 11 no longer perceivable through visual or tactile inspection.

Figure 4:
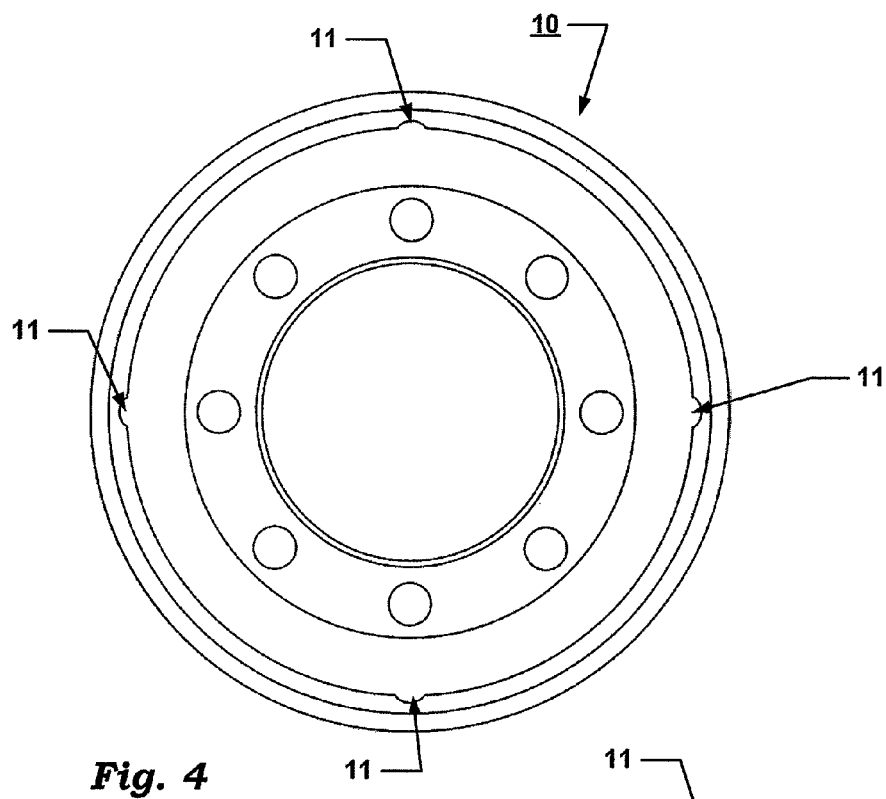
FIG. 4 is an inboard view of an exemplary brake drum according to an embodiment of the invention with multiple wear indicator notches.
Figure 5:
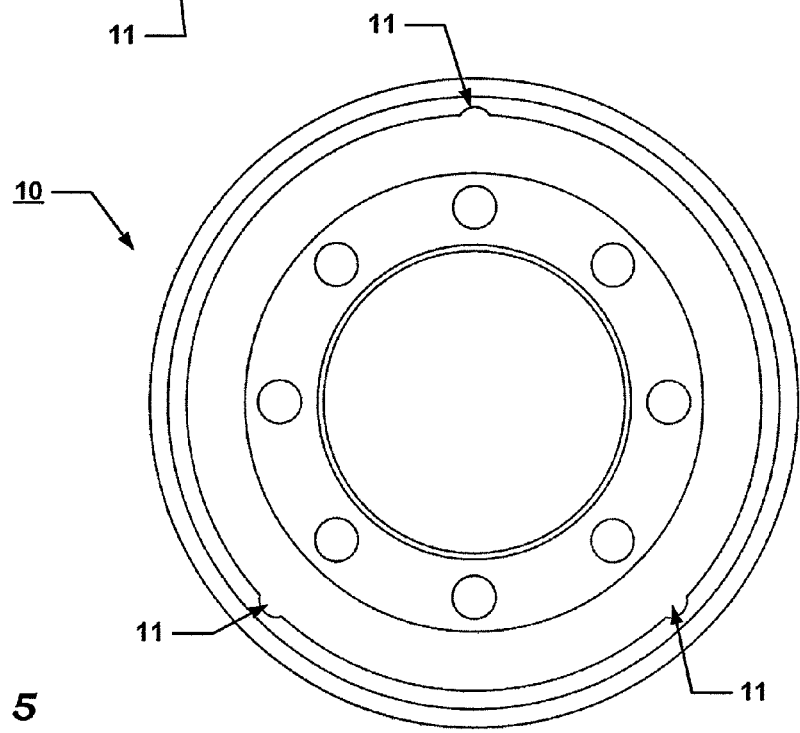
FIG. 5 is an inboard view of an exemplary brake drum according to an embodiment of the invention with multiple wear indicator notches.
Figure 6A:
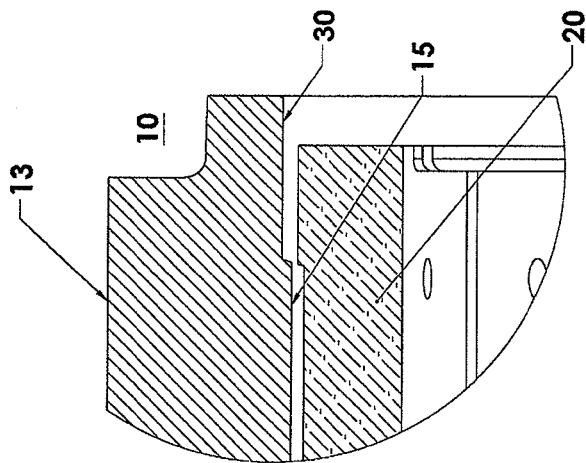
FIG. 6A is an inset of the indicated portion of FIG. 6.
Figure 6:
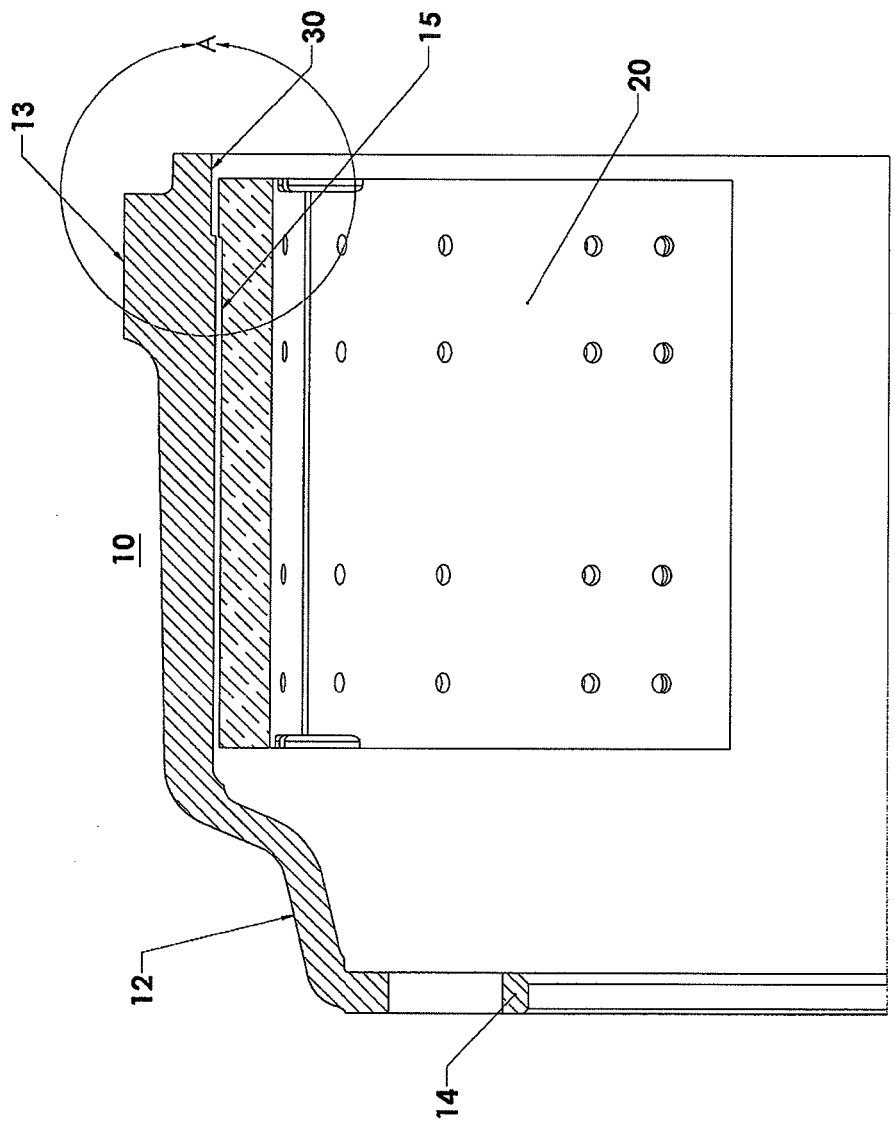
FIG. 6 is a section view of a prior art brake drum with a circumferentially oriented wear indicator notch.

Since the indentation 11 is located on the inboard edge of the braking surface 15, it may be inspected while the drum 10 is still mounted on the vehicle. Thus, if upon visual inspection, the indentation 11 can still be seen, the braking surface 15 is still within the maximum diameter. As illustrated in FIGS. 4 and 5, it is contemplated that a plurality of indentations 11 may be defined in the braking surface 15 as described above, at different locations about the circumference of the drum surface, that are generally accessible while the drum is installed on the vehicle, to increase the possible inspection locations.

Through the use of the aforementioned features, the inventive brake drum 10 provides a number of advantages. Because braking surface diameter may be easily visually inspected, a determination can be made by shop personnel, the driver, or law enforcement personnel. The brake drum will not have to be removed from the axle and measured to determine whether the braking surface has reached the maximum allowable diameter. This reduces vehicle down time, labor, and maintenance costs attributable to inspection. Lastly, use of the indentation 11 reduces likelihood of a brake drum remaining in service after the braking surface diameter has reached or exceeded the maximum allowable diameter.

As described above and shown in the associated drawings, the present invention comprises an integral braking surface wear indicator. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A brake drum comprising:
   a cylindrical drum body having an open inboard end and a hub mounting plate;
   a cylindrical braking surface extending between the open inboard end and the hub mounting plate within said drum body, said cylindrical braking surface having an inboard edge at the open inboard end of the hub and an outboard edge positioned adjacent to the hub mounting plate with a cylindrical braking surface width defined between the inboard edge and the outboard edge of the cylindrical braking surface;
   a notch that is void of material formed in said braking surface, extending toward said hub mounting plate from said inboard edge and having a maximum depth that corresponds to a pre-defined braking surface diameter that is less than or equal to a maximum allowable diameter of the braking surface;
   said notch having an open end positioned at the open inboard end of the drum body and a closed end with a length defined there between and an opposing pair of sidewalls extending between the open inboard end and the closed end with a notch width defined there between, said notch width being less than said length along an entirety of said length and said length being less than the cylindrical braking surface width;
   said notch having a longitudinal axis that is parallel to an axis of rotation of the brake drum; and
   said outboard edge of said cylindrical braking surface being free of any notch or notches.

2. The brake drum of claim 1, further comprising at least two notches.

3. The brake drum of claim 1, wherein the notch has an arc-shaped cross section.

4. The brake drum of claim 3, wherein the notch tapers from the maximum depth to a minimum depth in a direction moving towards the closed end of the notch.

5. A vehicle comprising:
   a brake drum including:
      a cylindrical drum body having an open inboard end and a hub mounting plate;
      a cylindrical braking surface extending between the open inboard end and the hub mounting plate within said drum body, said cylindrical braking surface having an inboard edge at the open inboard end of the hub and an outboard edge positioned adjacent to the hub mounting plate with a cylindrical braking surface width defined between the inboard edge and the outboard edge of the cylindrical braking surface;
      a notch that is void of material formed in said braking surface, extending toward said hub mounting plate from said inboard edge and having a maximum depth that corresponds to a pre-defined braking surface diameter that is less than or equal to a maximum allowable diameter of the braking surface;
      said notch having an open end positioned at the open inboard end of the drum body and a closed end with a length defined there between and an opposing pair of sidewalls extending between the open inboard end and the closed end with a notch width defined there between, said notch width being less than said length along an entirety of said length and said length being less than the cylindrical braking surface width;
      said notch having a longitudinal axis that is parallel to an axis of rotation of the brake drum; and
      said outboard edge of said cylindrical braking surface being free of any notch or notches.

6. The vehicle of claim 5, wherein the notch has an arc-shaped cross section.

7. The vehicle of claim 6, wherein the notch tapers from the maximum depth to a minimum depth in a direction moving towards the closed end of the notch.

* * * * *